Patented Jan. 22, 1946

2,393,304

UNITED STATES PATENT OFFICE 2,393,304

REFRIGERANTS AND PROCESS OF MAKING THEM

Anthony F. Benning, Woodstown, and Frederick B. Downing, Penns Grove, N. J., and Roy J. Plunkett, Wilmington, Del., assignors to Kinetic Chemicals, Inc., Wilmington, Del., a corporation of Delaware No Drawing. Original application July 10, 1940, Serial No. 344,666. Divided and this application February 18, 1943, Serial No. 476,332

3 Claims. (Cl. 260—653)

A. This invention relates to the production of fluoro-halogen compounds of olefines by a new process and to certain new compounds which are produced by the process.

B. It is an object of this invention to produce reaction products of HCl with tetra-fluorinated olefines, particularly of tetra-fluoro-ethylene. Another and particular object of the invention is to produce such compounds by a process in which hydrogen chloride is reacted with tetra-fluoro ethylene. Another object is to substitute a better method for the production of certain known compounds of this type than that which involves the use of $SbF_3$. A particular object of the invention is to produce the product 1,1,2,2, tetra-fluoro-1-chloro ethane.

C. The objects of this invention are accomplished by the manufacture of fluoro-halogen compounds of olefines by a process involving the interaction of tetrafluorinated ethylene and hydrogen chloride in the presence of a catalyst. In this invention new compounds are produced by the addition of hydrochloric acid to tetra fluorinated ethylene in the presence of a catalyst, such as carbon, preferably at temperatures above 125° C., and under pressures which are preferably but not necessarily super-atmospheric. This process is particularly adapted to operation in the vapor phase but it is not limited thereto and may be applied, with proper modifications in temperature, length of the time of contact, and the other factors, to the treatment of liquid olefines.

D. In general, proportioned mixtures of the vapors of a tetra-fluoro-olefine and HCl are passed through solid contact materials consisting of particles of carbon. The vapors may be premixed or led separately into the reaction chamber. The gases may be preheated before entrance to the reaction chamber, although this is not necessary. After passing through the reaction tube the effluent gases may be purified, cooled, and liquefied.

E. The reaction tube may be made out of various materials: Glass, quartz, carbon and metal tubes have been used successfully. Carbon, silver, and platinum tubes have proven generally advantageous.

F. While the invention is susceptible of considerable variation and modification in the manner of its practical application, particularly as regards the proportion of the reactants, the temperature, pressure and exact method of procedure, the following examples, run at 1 atm. pressure unless otherwise specified, and in which the parts are by weight, will serve to illustrate how the invention may be practiced.

Example I

About 17 parts of $C_2F_4$ and 6 parts of anhydrous HCl were passed through 200 parts of carbon in a quartz tube maintained at about 200° C. A contact time of about 10 seconds was maintained. The effluent gases were passed through a water scrubber and after drying condensed. About 15 parts of reaction product were obtained, about 10 parts of which was $C_2HClF_4$ which had a boiling point of about −10° C.

Example II

About 18 parts of $C_2F_4$ and 6.8 parts of anhydrous HCl were passed through 40 parts of activated carbon in a course of four hours through a nickel-jacketed carbon tube. The temperature was maintained at about 300° C. with a contact time of 15 seconds. The effluent gases were washed, dried and collected. About 24 parts of reaction product were obtained. A fractionation of the condensate showed about 90% of the material boiling between the range of −9 to −10° C. The molecular weight from the vapor density of this product was found to be 139.2 as compared to the calculated value of 136.5 for $C_2HF_4Cl$. Some of the physical properties of $CF_2ClCHF_2$ are as follows:

Freezing point _____ °C__ −117
Boiling point _____ °C__ −10.2
Liquid density at 44.7° C._____ 1.299 g./cc.
Vapor density _____ 5.75 g./1.22/4° C. and 752.6 mm./Hg

Example III

About 42 parts of $C_2F_4$ and 31 parts of anhydrous HCl were passed through 40 parts of activated carbon in the course of two hours through a nickel-jacketed silver tube. A temperature of about 300° C. and a contact time of about 15 seconds was maintained. The effluent gases were washed, dried and collected. About 53 parts of product were obtained of which about 83% was $C_2HF_4Cl$ with a boiling range of −9 to −10° C.

Example IV

About 37 parts of $C_2F_4$ and 45 parts of anhydrous HCl were passed through 50 parts of activated carbon in a carbon tube in the course of five hours. A contact time of about 20 seconds was maintained. The carbon tube was maintained at about 400° C. during the course of the run. About 45 parts of product were obtained, a large percentage of which was $CF_2ClCHF_2$.

Example V

A run similar to Example IV was repeated except in this run a platinum lined tube was used and the contact time of the reactants cut in half. A lower conversion to $CF_2ClCHF_2$ was found in this case than that found in Example IV.

*Example VI*

About 75 parts of $C_2F_4$ and 106 parts of anhydrous HCl were slowly passed through activated carbon contained in a silver tube at such a rate as to maintain a contact time of about 50 seconds. The temperature was kept at about 200° C. The effluent gases were washed, dried and collected. About 93 parts of crude product which analyzed about 93% $C_2HF_4Cl$ were obtained which represents an organic recovery of about 95%.

*Example VII*

The procedure of Example VI was repeated except that a platinum lined base metal tube was used. The temperature was maintained at 150° C. Flow was at such a rate to maintain a contact time of about 65 seconds. The product was similar to that of Example VI.

*Example VIII*

About 65 parts of $C_2F_4$ and 48 parts of anhydrous HCl were passed through activated carbon contained in a steel-jacketed carbon tube. The temperature of the tube was kept at about 200° C., the contact time of the reactants at about 40 seconds and the pressure of the reaction at about 30 pounds per square inch absolute. About 87 parts of crude product were obtained. The crude analyzed over 85% $CF_2ClCHF_2$ which had a boiling range of $-9$ to $-10°$ C.

*Example IX*

About 490 parts of $C_2F_4$ and 360 parts of anhydrous HCl were reacted in a carbon-filled silver tube. A pressure of 150 pounds per square inch absolute, a contact time of about 15 seconds, and a temperature of about 300° C. were used. About 600 parts of crude were obtained which analyzed over 90% $CF_2ClCHF_2$.

*Example X*

About 245 parts of $C_2F_4$ and 180 parts of anhydrous HCl, previously premixed, were continuously passed through carbon in a silver tube. The pressure was maintained at about 100 pounds per square inch absolute with a contact time of about 30 seconds and a temperature of about 325° C. The effluent gases were washed, dried and compressed in an ice water cooled receiver which condensed most of the $CF_2ClCHF_2$. The unreacted $C_2F_4$ was continuously fed back into the silver addition tube.

G. The temperature and pressure used in effecting the addition may vary within relatively wide limits. Satisfactory results have been obtained in the use of temperatures as high as 400° C., and even higher temperatures may be used so long as they do not cause decomposition of the reactants, but the preferred temperature range is between 125° C. to 350° C. For the production of $CF_2ClCHF_2$, temperatures around 190° to 250° have been found especially satisfactory. Subatmospheric, atmospheric, and superatmospheric pressures may be used. Satisfactory results have been obtained with the use of pressures ranging from 1 atm. absolute to 10 atm. absolute, although pressures greater or less are suitable, the controlling factor in the choice of the pressure, and temperature also, being the attainment of high yields of a desired compound with the minimum of undesirable by-product formation.

H. Various forms of carbon may be used as catalysts, for example, charcoal prepared from various vegetable sources, bone char, coke from petroleum, and from coal. In general material consisting essentially of carbon which has been prepared by the distillation of organic material has been found satisfactory. The carbon, regardless of source and mode of preparation, preferably should have adsorptive properties. Very desirable results have been obtained in the use of the so-called activated carbons such as may be prepared in various well known ways, for instance, by heating carbon to high temperatures in the presence of air, or steam.

I. The contact time used may vary according to the reactants and the proportions of the reactants used. Generally speaking, it is preferable to employ a contact time of about 10 to 120 seconds but longer times are successful. In the production of $CF_2HCF_2Cl$ especially desirable results have been obtained by the use of pressures of about 45 to 150 pounds per square inch, temperatures of 150° to 325° C., and contact times from 15 to 110 seconds.

J. The reaction and the separation or isolation of the products by distillation fractional or otherwise, may be carried out continuously or in separate steps. It is not necessary that the pressure of the two steps be the same.

K. A major accomplishment of this invention is the compound $CHF_2CClF_2$ which is useful as a refrigerant. This refrigerant has a particular element of utility in that it satisfies the particular requirements of rotary type compressors. Another valuable feature of this invention is that this new compound is produced by a process which is economically and technically satisfactory.

L. As many apparently widely different embodiments of this invention may be made without departing from the spirit and scope thereof, it is understood that we do not limit ourselves to the specific embodiments thereof except as defined in the appended claims.

M. This application is a division of the application identified as Benning et at., Serial No. 344,666, filed July 10, 1940, entitled "Refrigerants and process of making them."

We claim:

1. The method of producing $CHF_2CClF_2$ which comprises passing $C_2F_4$ and anhydrous HCl in vapor phase through a carbon catalyst at a temperature between 190° to 250° C. at a pressure of from 1 to 10 atmospheres and at velocity of about 10 to 40 seconds contact time, scrubbing the product with water, drying it, and isolating.

2. The method of producing $CHF_2CClF_2$ which comprises passing $C_2F_4$ and anhydrous HCl in vapor phase through a carbon catalyst at a temperature of from about 150° C. to about 400° C., at a pressure of from 1 to 10 atmospheres and at a velocity selected for the efficiency of the reaction, cleaning and isolating the principal product.

3. The method of producing $CHF_2CClF_2$ which comprises heating $C_2F_4$ with anhydrous HCl at temperatures of from about 150° C. to about 400° C. in the presence of carbon as a catalyst.

ANTHONY F. BENNING.
FREDERICK B. DOWNING.
ROY J. PLUNKETT.